United States Patent [19]

Liotino

[11] 4,255,616
[45] Mar. 10, 1981

[54] CABLE SUPPORT ASSEMBLY FOR ELECTRICAL PENETRATION ASSEMBLY FOR REACTOR CONTAINMENT

[75] Inventor: Vito A. Liotino, Horseheads, N.Y.

[73] Assignee: Westinghouse Electric Corp., Pittsburgh, Pa.

[21] Appl. No.: 4,515

[22] Filed: Jan. 18, 1979

[51] Int. Cl.² .................. G21C 13/04; H01B 17/26
[52] U.S. Cl. ................................ 174/151; 174/27; 174/99 E; 248/56
[58] Field of Search .............. 174/11 R, 12 R, 18, 174/27, 99 R, 99 B, 99 E, 151; 248/56; 285/189

[56] References Cited

U.S. PATENT DOCUMENTS

| | | | |
|---|---|---|---|
| 1,037,522 | 9/1912 | Von Pindtershofen | 174/27 |
| 3,361,870 | 1/1968 | Whitehead | 174/99 E |
| 4,107,456 | 8/1978 | Schuster et al. | 174/151 |

FOREIGN PATENT DOCUMENTS 1046714 12/1958 Fed. Rep. of Germany ........... 174/151

*Primary Examiner*—Laramie E. Askin
*Attorney, Agent, or Firm*—W. G. Sutcliff

[57] ABSTRACT

A cable support assembly for the electrical cables between sealed electrical penetration assemblies within a reactor penetration nozzle has been detailed. The cable support assembly is anchored at one end and slidably movable at the other end to provide for seismic and thermal movement. The cable support assembly includes conduits for protecting and shielding the cables which are disposed within the conduits.

8 Claims, 5 Drawing Figures

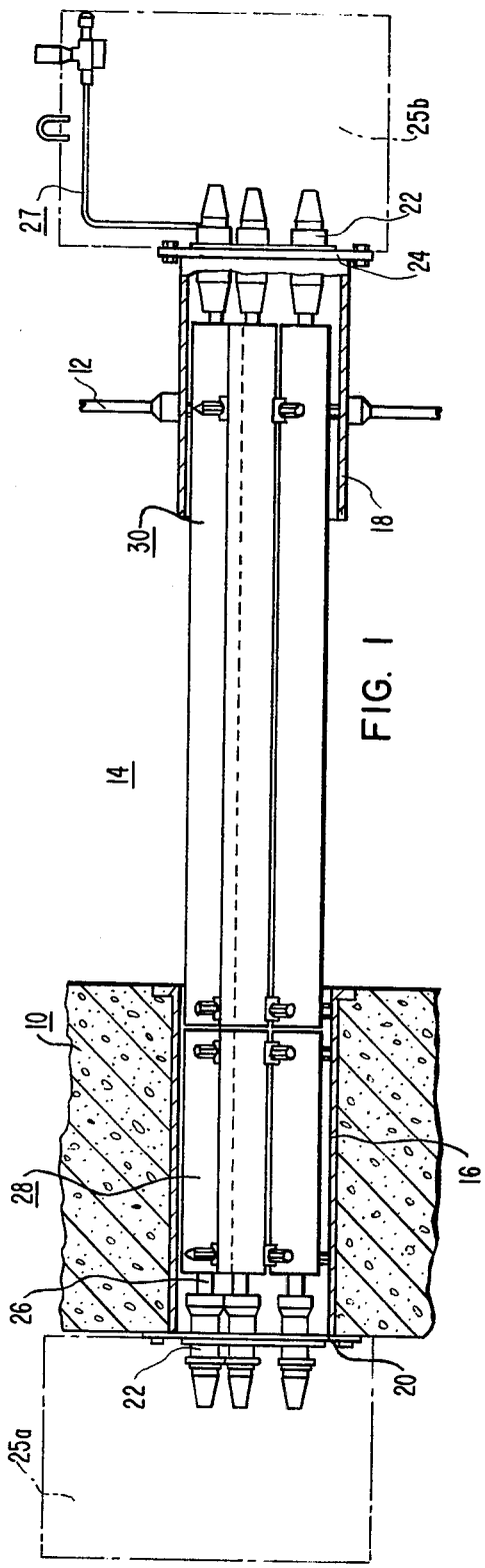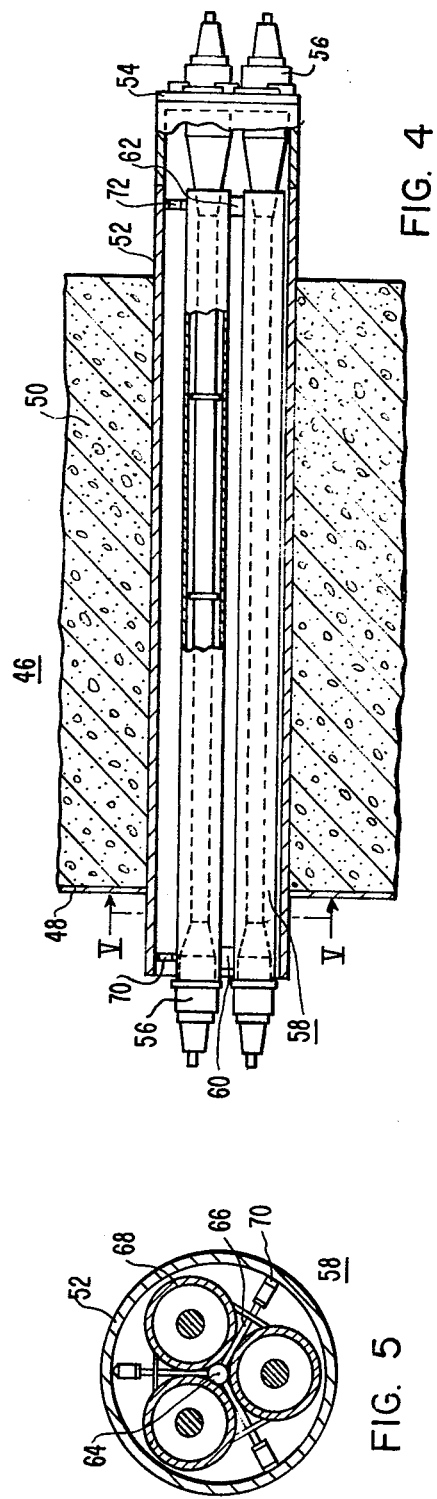

CABLE SUPPORT ASSEMBLY FOR ELECTRICAL PENETRATION ASSEMBLY FOR REACTOR CONTAINMENT

BACKGROUND OF THE INVENTION

The present invention relates to electrical cable support assemblies for electrical penetration assemblies which provide electrical connection through the biological, environment containment of a nuclear reactor system.

The nuclear reactor containment comprises a sealed containment building which may be of the type with a steel liner and a thick concrete wall about the liner, or of the double containment annular type where a steel shield wall is spaced from a surrounding concrete containment wall. In either case, the containment is sealed and designed to withstand unlikely accident conditions to ensure that no radioactive material can breach the containment to the surrounding environment.

Numerous electrical cables must be sealed through the containment to provide electrical operating power, instrumentation, and control capability for the reactor systems. An electrical penetration assembly is the sealed feed-through device by which such electrical connections are made through the containment. Thick walled pipes or nozzles are provided through the steel and concrete wall portions of the containment. The electrical penetrations pass through these nozzles and are sealed at header plates at opposed ends of the nozzles. The typical electrical penetration is of a modular configuration as described in U.S. Pat. No. 3,882,262, and comprises a tubular metal housing with one or more electrical leads sealed within the housing and extending beyond each end for electrical connection. A plurality of such penetration modules are brought through a header and nozzle.

It is desirable to segregate or shield the individual electrical cables or cable bundles within the nozzle for safety as well as electrical shielding reasons. The containment and penetration design must also provide for seismic and thermal movement or expansion of the containment building with the penetration remaining sealed.

SUMMARY OF THE INVENTION

A cable support assembly for the electrical cables between sealed electrical penetration assemblies within a penetration nozzle is detailed. The cable support assembly comprises at least two spaced apart axially aligned central support means with a plurality of radially extending support arms extending outwardly from each of the central support means. A plurality of tubular cable conduit members extend between the spaced apart axially aligned central support means, with individual tubular cable conduit members nested between and supported from adjacent radially extending support arms. One of the central support means is disposed within a nozzle portion of the penetration assembly, and anchor mounting means are provided at the extending ends of at least a portion of the support arms to anchor the cable support assembly end within the nozzle. The other central support means is also disposed within a nozzle portion of the penetration assembly and has movable mounting means provided at the extending ends of the support arms which extend radially therefrom.

The detailed cable support assembly of the present invention permits easy field installation without welding and simple adjustment to the various size diameter tubular conduit or pipe. The structure allows for expansion between the nozzle and the cable support assembly since only one end is fixed with the other end free to move. The structure can be utilized with either a single-walled containment or with an annular, spaced apart double-walled containment.

BRIEF DESCRIPTION OF THE DRAWINGS

FIG. 1 is a side elevation view of an embodiment of the present invention illustrating its use with an annular, spaced-apart double-walled containment, in which two such cable support assemblies are employed.

FIG. 4 is a side view of a cable support assembly of the present invention in a single-walled containment.

FIG. 5 is a view taken through the cable support assembly in the direction of the line V—V of FIG. 4.

DESCRIPTION OF THE PREFERRED EMBODIMENTS

Figure 2:
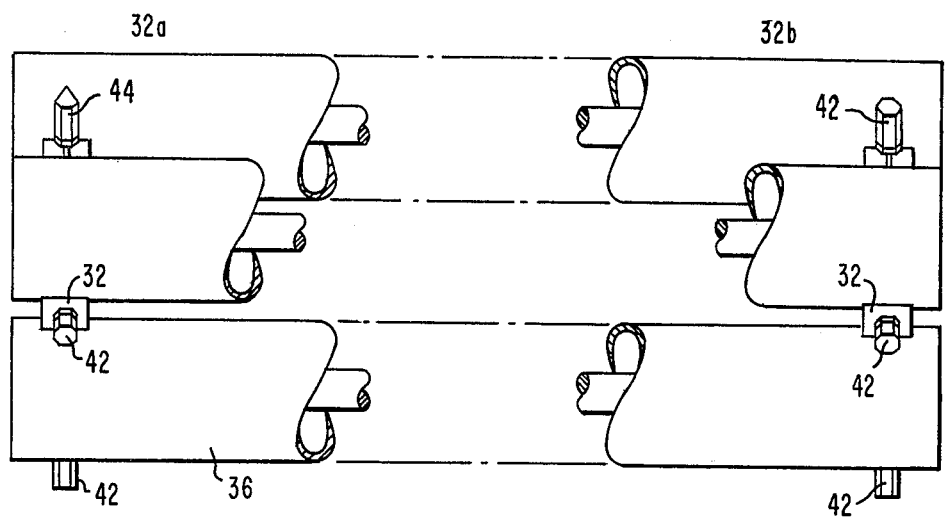
FIG. 2 is an enlarged partial side elevation view of a single cable support assembly.
Figure 3:
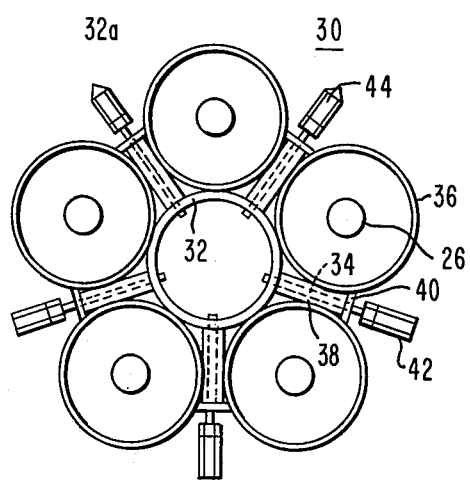
FIG. 3 is an end view of the assembly of FIG. 2.

In the embodiment of the invention seen in FIGS. 1, 2 and 3, a thick walled concrete containment 10 is seen spaced from steel shield containment wall 12, with annular volume 14 defined therebetween. A first nozzle 16 passes through the concrete containment 10, and a second axially aligned nozzle 18 passes through the steel shield containment 12. A first sealed header 20 is sealed to the outboard end of first nozzle 16, with a plurality of penetration modules 22 sealed through header 20. A second sealed header 24 is sealed to the inboard end of second nozzle 18, with a plurality of penetration modules 22 sealed through header 24. Electrical cables 26 extend between the aligned penetration modules. Protective terminal boxes 25a, 25b are respectively provided about the header 20 and header 24 and the modules which extend through these headers. Electrical connections are made from the penetration conductors to distribution conductors within these terminal boxes. A leak detection system 27 is associated with the modules 22 passing through header 24.

A first electrical cable support assembly 28 is disposed within first nozzle 16. An axially aligned second electrical cable support assembly 30 extends from within the first nozzle 16 to within the second nozzle 18 and is closely spaced from the support assembly 28. The cable support assemblies 28 and 30 have the same basic structure as seen in greater detail in FIGS. 2 and 3. In this embodiment, the second assembly 30 is longer to bridge the annular volume 14. The cable support assembly 30 will be described in detail with respect to FIGS. 2 and 3. The assembly 30 comprises a pair of annular central support means 32 having a plurality, here five, radially extending support arms 34 which are symmetrically spaced about the central support means 32. A plurality of tubular cable conduit members 36, here again five conduits, extend between the spaced apart central support means 32. The individual electrical cables 26 or cable bundles extend within individual tubular cable conduit members 36. The tubular cable conduit members 36 are nested between adjacent radially extending support arms.

A tubular spacer member 38 is disposed over each of the threaded support arms and extends from the central annular support to a position between adjacent tubular conduits 36 to space them apart. A washer member 40 fits on the support arm and is brazed or welded to each of the adjacent tubular conduits 36 to fixedly space them apart and physically connect them to the central support means 32. The tubular conduits 36 also contact the center support means 32 at a tangent point for further support.

One of the pair of center support means 32 is adapted to serve as an anchoring means 32a, in the embodiment of FIG. 2. The left end support means 32 is the anchoring means while the other one serves as a movable sliding support to the nozzle. The adaptation of support means 32 to an anchoring or sliding movable support is had by the type of nut which is threaded onto the extending ends of the radially extending support arms. The anchoring support means 32a as seen in detail in FIG. 3 has three arms with sliding nuts 42 threaded in place and locked onto the support arm ends. The two uppermost support arms have anchor nuts 44 threaded and locked in place and anchoring the cable support assembly to the nozzle within which it is disposed. The other movable, slidable support means 32b has a sliding nut 42 mounted on each of the radially extending arms so that this end of the cable support assembly is movable within the nozzle.

The embodiment of the invention seen in FIGS. 4 and 5 illustrates a single walled containment 46 formed of a steel liner 48 and concrete containment wall 50. The nozzle 52 passes through the containment and a header 54 is sealed at least at one end of the nozzle with electrical penetration modules 56 sealed through the header. In this embodiment, a single cable support assembly 58 is disposed within the nozzle 52 with one central support means 60 adapted as an anchoring means to the nozzle. The other spaced central support means 62 at the other end of the nozzle is adapted as a movable slidable support within the nozzle. As in the embodiment of FIGS. 1-3, the anchoring of the support means is had by providing pointed locking nuts 70 on the ends of the radially extending arms 66. The support means is made movable by providing smooth ended sliding nuts 72 on the ends of the radially extending arms 66.

In this embodiment of FIGS. 4 and 5, the central support means 60 and 62 have a solid rod-like center member 64, with three radially extending arms 66 extending symmetrically therefrom. Three tubular cable conduits 68 are nested between the radially extending arms as explained with respect to the FIG. 3 embodiment, with the tubular cable conduits 68 extending between and beyond the spaced aligned central support means.

The present design permits ready adjustment of the assembly to varying numbers of tubular conduits spaced about the center support nested between the radially extending arms.

The anchor nuts are tightened in place during field assembly in the nozzle after the electrical cables have been fed through the respective conduits.

The cable support assembly components are generally formed of high strength stainless steel.

I claim:

1. In an electrical penetration assembly for a nuclear reactor containment, which containment includes a first containment wall with a first cylindrical nozzle therethrough, an annularly spaced apart second containment wall constituting a shield wall having a second cylindrical nozzle therethrough, with the first and second nozzles being axially aligned, with a cable support assembly for mounting and shielding electrical cables which sealingly pass through the axially aligned nozzles, the improvement being cable support assembly comprising:
   (a) at least two spaced apart axially aligned central support means with a plurality of radially extending support arms extending outwardly from each of the central support means;
   (b) a plurality of tubular cable conduit members extending between the spaced apart axially aligned central support means, with individual tubular cable conduit members nested between and supported from adjacent radially extending support arms;
   (c) one of the central support means being disposed within a nozzle portion of the penetration assembly, and anchor mounting means provided at the extending ends of at least a portion of the support arms which extend radially therefrom to fixedly anchor one end of the cable support assembly within the nozzle portion, and the other central support means also being disposed within a nozzle portion of the penetration assembly and having movable mounting means provided at the extending ends of the support arms which extend radially therefrom to permit sliding movement of the other end of the cable support assembly within that nozzle portion.

2. The improved electrical penetration assembly set forth in claim 1, wherein a first cable support assembly means is disposed within the first cylindrical nozzle through the first containment wall, and a second cable support assembly means extends from within the second cylindrical nozzle to within the first cylindrical nozzle.

3. The improved electrical penetration assembly set forth in claim 1, wherein the central support means are annular bodies, and the plurality of tubular cable conduit members are symmetrically disposed about the annular bodies.

4. The improved electrical penetration assembly set forth in claim 1, wherein the central support means comprises short solid cylindrical bodies, and the plurality of tubular cable conduit members are symmetrically disposed about the solid cylindrical bodies.

5. The improved electrical penetration assembly set forth in claim 1, wherein the radially extending support arms include threaded extending end portions with the movable mounting means comprising sliding nuts which are threaded on the threaded extending end portions of the support arms, and wherein the anchor mounting means comprises anchor nuts which are threaded on the threaded extending end portions of the support arms.

6. The improved electrical penetration assembly set forth in claim 1, wherein washers are disposed on the support arms extending between and connected to adjacent tubular cable conduit members.

7. The improved electrical penetration assembly set forth in claim 1, wherein the cable support assembly extends across the annulus between the spaced apart containment wall and shield wall of the nuclear reactor containment.

8. In an electrical penetration assembly for a nuclear reactor containment, which containment comprises a containment wall with an adjacent liner with a cylindrical nozzle passing through the containment wall and liner, with cable support assembly means for mounting and shielding electrical cables which sealingly pass through the nozzle, the improvement being cable support assembly means comprising:
(a) at least two spaced apart axially aligned central support means with a plurality of radially extending support arms extending outwardly from each of the central support means;
(b) a plurality of tubular cable conduit members extending between the spaced apart axially aligned central support means, with individual tubular cable conduit members nested between and supported from adjacent radially extending support arms;
(c) one of the central support means being disposed within a nozzle portion of the penetration assembly, and anchor mounting means provided at the extending ends of at least a portion of the support arms which extend radially therefrom to fixedly anchor one end of the cable support assembly means within the nozzle portion, and the other central support means also being disposed within a nozzle portion of the penetration assembly and having movable mounting means provided at the extending ends of the support arms which extend radially therefrom to permit sliding movement of the other end of the cable support assembly means within the nozzle portion.

* * * * *